(12) United States Patent
Pauly (10) Patent No.: US 6,880,147 B1
(45) Date of Patent: Apr. 12, 2005

(54) SYSTEM AND METHOD FOR DEVELOPING SOFTWARE UTILIZING DETERMINATIVE REPRESENTATIONS

(75) Inventor: Martin Pauly, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 319 days.

(21) Appl. No.: 09/656,685

(22) Filed: Sep. 7, 2000

(51) Int. Cl.[7] .............................. G06F 9/44; G06F 7/60; G06F 9/45

(52) U.S. Cl. ........................ 717/104; 717/105; 703/2; 703/22

(58) Field of Search ............................... 717/104, 105; 703/2, 22

(56) References Cited

U.S. PATENT DOCUMENTS

| | | | |
|---|---|---|---|
| 5,099,440 A | * 3/1992 | Pennebaker et al. | 702/181 |
| 5,187,788 A | * 2/1993 | Marmelstein | 717/109 |
| 5,331,579 A | * 7/1994 | Maguire et al. | 703/2 |
| 5,495,409 A | * 2/1996 | Kanno | 702/182 |
| 5,541,863 A | * 7/1996 | Magor et al. | 703/8 |
| 5,671,415 A | * 9/1997 | Hossain | 717/101 |
| 5,826,065 A | * 10/1998 | Hinsberg et al. | 717/104 |
| 5,995,753 A | * 11/1999 | Walker | 717/108 |
| 6,101,524 A | * 8/2000 | Choi et al. | 717/127 |
| 6,158,001 A | * 12/2000 | Lee et al. | 709/220 |
| 6,173,438 B1 | * 1/2001 | Kodosky et al. | 717/105 |
| 6,289,502 B1 | * 9/2001 | Garland et al. | 717/104 |
| 6,405,361 B1 | * 6/2002 | Broy et al. | 717/100 |
| 6,408,262 B1 | * 6/2002 | Leerberg et al. | 703/2 |

OTHER PUBLICATIONS

"ControlShell: A Real–Time Software Framework, User's Manual Version 5.1", Real–Time Innovations, Inc., 1996, Chapters 8 and 9.*
G. C. Murphy, D. Notkin, "Lightweight Lexical Source Model Extraction", 1996, ACM, p. 262–292.*
D. T. Ross, "The AED approach to generalized computer–aided design", 1967, ACM, p. 367–385.*
Uczekaj, John S., "Reusable Avionics Software Evolution of the Flight Management System", 1995, IEEE, p. 342–346.*
Harel, David "Statecharts: A Visual Formalism For Complex Systems" from Science of Computer Programming vol. 8, No. 1, Feb. 1987.

* cited by examiner

Primary Examiner—Kakali Chaki
Assistant Examiner—Qamrun Nahar
(74) Attorney, Agent, or Firm—Nathan O. Jensen; Kyle Eppele (57) ABSTRACT

A statechart includes a state having two or more parallel states. The two or more parallel states are ordered to ensure determinism for the system. The statecharts can be modified Harel statecharts. The statecharts can be utilized to generate avionics software.

8 Claims, 4 Drawing Sheets

SYSTEM AND METHOD FOR DEVELOPING SOFTWARE UTILIZING DETERMINATIVE REPRESENTATIONS

FIELD OF THE INVENTION

The present invention relates generally to models and representations utilized in generating software. More particularly, the present invention relates to a system for and a method of creating software utilizing a deterministic model or a representation of a complex control system.

BACKGROUND OF THE INVENTION

Software often must be designed and developed as part of a large and complex reactive system. A reactive system is utilized in a variety of applications, such as, telecommunications, automobiles, computer networks, personal computers, avionic systems, process controls, man-machine interfaces, and other systems. Generally, reactive systems are event driven and continuously react to external and internal stimuli. The external and internal stimuli can be human operator initiated or can be provided from completely external equipment or happenings.

One type of reactive system is a graphical user interface for flight plan editing in a graphical flight management system (FMS). Developing software for a reactive system, such as, the graphical user interface, requires that the behavior of the reactive system be modeled or represented in a formal fashion.

Generally, the reactive system can be modeled or represented as a state machine. A state machine is an abstract control model consisting of a set of states, a set of input events, a set of output actions and a state transition function. A function takes the current state and an input event and returns a set of output events and the next state. Some states may be designated as "terminal states." A terminal state is an ending state from which the state machine does not exit.

The state machine can also be viewed as a function which maps an ordered sequence of input events into a corresponding sequence of (sets of) output events. State machines are often represented by state transition diagrams to effectively specify the behavior of reactive systems. Statecharts are a type of state transition diagram described in more detail below. Statecharts efficiently represent a set of states and the transition between states based upon events. The graphical notation associated with statecharts is easily understandable and can be utilized to support discussions and conversations about the system. Such a representation or graphical notation is highly valuable when evaluating the workings of a graphical user interface.

State machines can be deterministic or non-deterministic. A deterministic state machine is one where the next state is uniquely determined by a single input event. A non-deterministic state machine may have several possible next states for a given input event. The next state that is actually chosen may either be chosen randomly or it may be chosen based upon an arbitrary number of subsequent input events. In the latter case, until these subsequent events occur, it is not possible to determine the state within which the machine resides. It is generally possible to automatically translate a non-deterministic state machine into a deterministic one which will produce the same output given the same input.

Simple statecharts or state transition diagrams, such as deterministic finite automations (DFA), have been utilized to study languages, such as programming languages. The goal of such simple state transition diagrams is to allow the state machine to determine whether or not a given word is contained in a language. A DFA has a finite set of states and transitions where each transition leads from one state to another. Each transition is associated with a particular input character; the transition can only cause a change in the active state when that particular input character is read from the input word. At any given time, only one of the states is active, i.e., the next input character (read from the word to be recognized) is able to activate only those transitions that depart from the active state.

One state is the designated start position (it is active state when the first input character is read). One or more states are defined as terminating states. After the input word has been read completely, if the state machine has arrived to a terminating state, the word is accepted. Otherwise, the word is rejected (i.e., not in the language recognized by the DFA). The set of a languages that can be recognized by DFAs equals the set of languages that can be described using regular expressions. Therefore, this set of languages is called regular languages.

Several extensions of more advanced concepts of state transition systems have been proposed. Some extensions introduce more complex languages than regular languages and others better support tasks not related to programming languages. As a trend of controlling systems by computers and software increases, many more systems are represented as being state based. Using automations and state transition diagrams to specify these systems becomes increasingly more popular and effective. A significant difference between the described conventional extensions and more advanced concepts to state transition systems when compared to DFAs is that these extensions do not include a terminating state. Although these computer systems can be switched off and thus are forced to terminate, these systems no longer recognize or reject words of finite length.

DFAs are not appropriate for more complex application which do not include terminating states. With the exception of certain military applications, the complex systems are often designed so that they can potentially operate forever. Although it is possible to specify behavior of a complex system such as a graphical interface (GUI) using DFAs, an exceedingly large number of transitions and states is necessary due to global options and parallel execution, respectively.

Another difference between the described conventional extensions and more advanced concepts is that state transitions in complex systems are not triggered by characters read from an input word as in a DFA system. Rather, external events drive the systems. For example, external events can be keystrokes, expiration of timers, arrival of messages from another computer, sensor signals, mouse clicks, etc. These events are called external because their source is outside of the state machine. The events are also discrete in that they either occur or do not occur. Events which are recognized by the state machine can lead to changes or transitions in the state. Events that are not recognized do not cause a change in the active state (the system continues to run in its present active state). There is no equivalence of rejecting an input word as utilized in a DFA.

Generally, non-deterministic statecharts can be converted to an equivalent deterministic statechart if both machines recognize the same language. However, the deterministic statechart becomes extremely complex because the definition of equivalence of automations is not helpful. Also, there is a need for a deterministic statechart that can provide a specification for a reactive system. One type of statechart system utilizes a Harel statechart which is fully described in Harel, "Statecharts: A Visual Formalism for Complex Systems" *Science of Computer Programming* 8 (1987), pp. 231–274. Harel statecharts are well known by one of ordinary skill in the art. However, Harel statecharts are not deterministic. There is nothing in its rules which prevent two different states from being the result of the same input criteria.

Thus, there is a need for a deterministic state machine defined by statecharts. Further, there is a need for a deterministic statechart that can be used to design complex reactive systems, such as, avionic software. Further still, there is a need for a modified Harel statechart which is deterministic.

SUMMARY OF THE INVENTION

An exemplary embodiment relates to a statechart for use in the development of avionic software. The avionic software requires deterministic behavior. The statechart includes a first state, a second state and a third state. The third state includes the first and second parallel states. The first state is ordered with respect to the second state. The state chart does not allow parallel states to be unordered to ensure deterministic behavior of the statechart.

Another embodiment relates to a modified Harel statechart formed on a computer. The modified Harel statechart includes a mathematical representation of a group of states. The group of states includes a first state including a plurality of ordered parallel states. The mathematical representation ensures deterministic operation.

Still another embodiment relates to a computer code for statechart editor. The computer code includes code for generating a graphical representation of a state including parallel states and code for ordering the parallel states.

Still another embodiment relates to a method of providing avionic software. The method includes providing a graphical representation of a state, and applying the graphical representation to an execution engine to create the avionic software. The state includes a plurality of parallel states which are ordered with respect to each other. The parallel states are ordered so that only one of the parallel states is active in response to a particular event.

Yet still another embodiment relates to a statechart for use in the development of software for an application. The statechart includes a first state means, a second means, and a third state means. The first state means represents a first condition of the software in the application. The second state means indicates a second condition and is within the first state means. The third state means represents a third condition and is also within the first state means. The third state means is ordered with respect to the second state means.

BRIEF DESCRIPTION OF THE DRAWINGS

Exemplary embodiments will hereafter be described with reference to the accompanying drawings, wherein like numerals denote like elements, and.

DETAILED DESCRIPTION OF PREFERRED EXEMPLARY EMBODIMENTS

Figure 1:
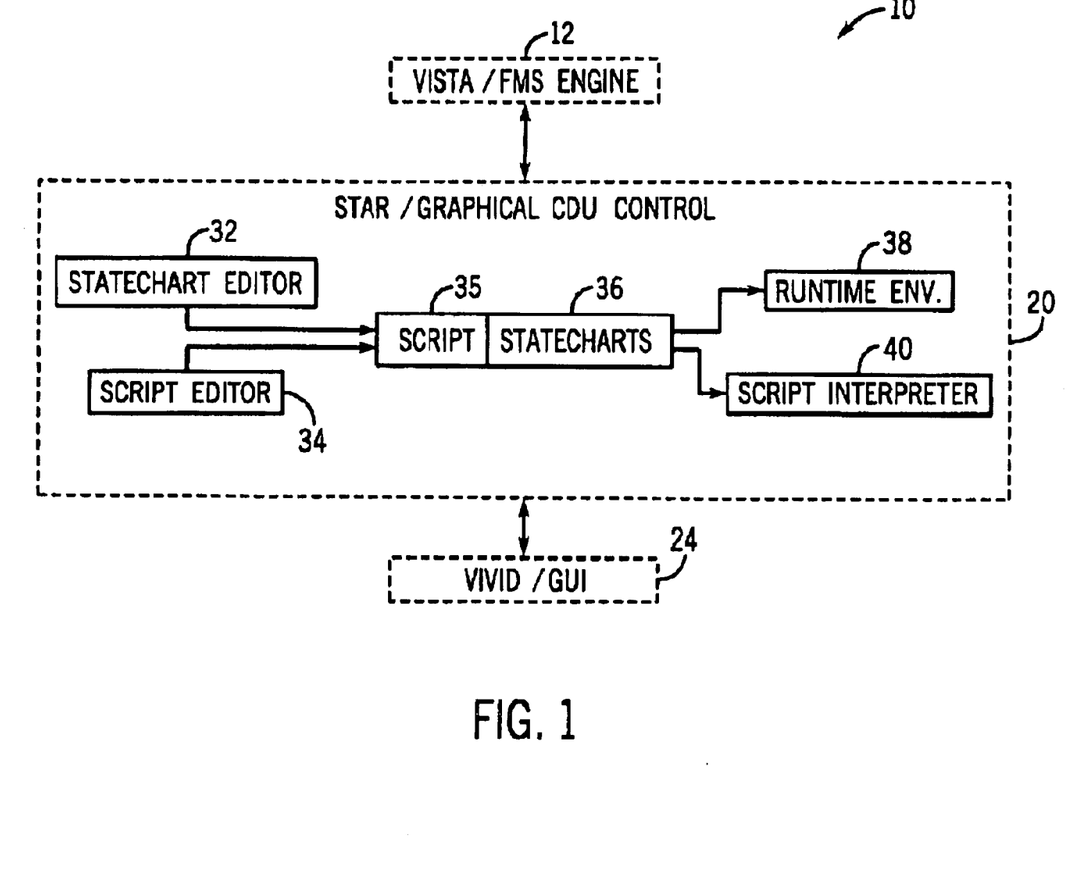
FIG. 1 is a schematic block diagram of a system for generating software in accordance with an exemplary embodiment the program system including a statechart editor.

In FIG. 1, a system 10 includes a software engine 12, a control unit 20 and an operator interface 24. System 10 can be a software/hardware system for avionics applications, such as flight management systems (FMS) capable of flight planning functions. Alternatively, system 10 can be utilized in other complex reactive systems.

Control unit 20 includes a statechart editor 32, a script editor 34, scripts 35, statecharts 36, a runtime environment 38, and a script interpreter 40. Control unit 20 can be a STAR/graphical control display unit. Control unit 20 serves as a translator for interpreting commands from interface 24 and providing instructions to engine 12. The various states associated with system 10 exist in unit 20. Interface 24 can allow the user to visualize these various states as discussed in more detail below.

Interface 24 is any system which allows user commands to be input into system 10. Interface 24 can include keyboards, keypads, mouse devices, trackballs, joysticks or other interfaces. Interface 24 can be a VIVID/GUI interface which includes a graphical editor and prototype development tool for avionics displays.

Engine 12 can be an actual Flight Management System or a VISTA/FMS engine. The VISTA/FMS engine is an aircraft simulation software tool which provides functions associated with an FMS, such as, flight planning.

Statechart editor 32 is a software tool capable of creating and revising graphical representations of statecharts 36 through interface 24 or through a computer. Graphical statechart editor 32 can create statecharts 36 which are executed by runtime environment 38. Preferably, statecharts 36 are fully deterministic and can advantageously be utilized for avionics software development, such as, flight maintenance systems. Editor 32 is preferably an editor capable of graphically editing and defining states and transitions for system 10.

Run time environment 38 is a hardware or software tool capable of executing statecharts 36. Run time environment 38 executes statecharts 36 and interacts with engine 12 to operate a state machine in accordance with statecharts 36.

Script editor 34 is a textural editor capable of creating and editing scripts 35. Scripts 35 are executed by script interpreter 40. Script interpreter 40 can be closely related to run time environment 38.

Figure 2:
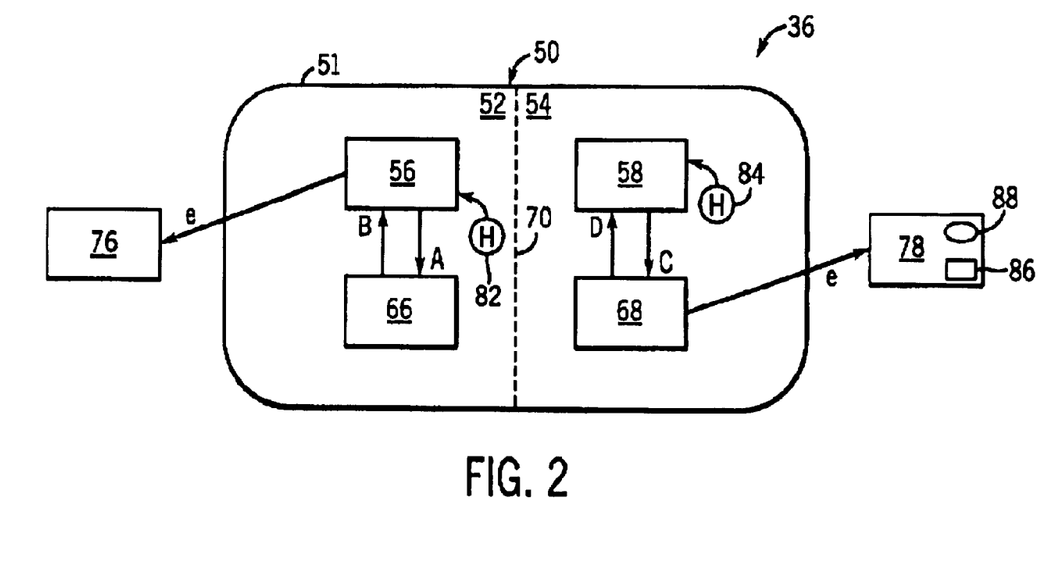
FIG. 2 is a schematic block diagram of a statechart for use in the system illustrated in FIG. 1.

With reference to FIG. 2, an exemplary statechart 50 of statecharts 36 (FIG. 1) is shown. Statechart 50 is a graphical representation that can be edited or created on editor 32. Statechart 50 includes a superstate 51, a state 76 and a state 78. Superstate 51 includes a parallel state 52 and a parallel state 54. Parallel state 52 includes a substate 56 and substate 66, and parallel state 54 includes a substate 58 and substate 68. State 78 includes a substate 86 and substate 88.

When the state machine (partially represented by statechart 50) is in superstate 51, the state machine can be either in parallel state 52 or parallel state 54. From substate 56 of parallel state 52, the state machine enters a substate 66 upon an event A. From substate 66 of parallel state 52, state machine enters a substate 56 upon an event B. From substate 56 of parallel state 52, state machine enters state 76 upon event E, thereby leaving parallel state 52 and superstate 51.

Similarly, from substate 58 of parallel state 54, the state machine enters substate 68 upon an event C. From substate 68 of parallel state 54, the state machine enters substate 58 upon an event D. From substate 68 of parallel substate 54, the state machine enters state 78 upon event E leaving parallel state 54 and superstate 51.

The described transitions are all readily ascertainable from the graphical representation of statechart 50 shown in FIG. 2. Statechart 50 allows events, states and substates to be analyzed in a convenient fashion. For example, the state machine enters state 76 or state 78 from superstate 51 upon an event E, depending upon the state within which the machine resides (substate 56 or substate 68). If the state machine is in substate 56 of parallel state 52 and in substate 68 of parallel state 54, it enters state 76 upon an event due to the priority of parallel state 52 over parallel state 54.

As shown in FIG. 2, various graphical symbols convey information about the operation of the state machine. For example, rectangles represent superstates, or substates and arrows represent events. Superstate 51 includes several states such as states 56, 58, 66 and 68. Dashed line 70 indicates that superstate 51 is a parallel superstate including two parallel states 52 and 54. Superstate 51 including parallel states 52 and 54 has all of its parallel states 52 and 54 active when superstate 51 is active. State 78 only has one of substates 86 or 88 active because substates 86 and 88 are not parallel states.

Superstate 51 can include several more parallel states. In addition, any of substate 56, 58, 66, 68, 86 and 88 or states 76 and 78 can include parallel states. Unlike parallel states as defined by Harel, statechart 50 has an order or priority to parallel states 52 and 54 to ensure that statechart 50 is determinative. That is, left-to-right ordering can be utilized wherein the same event (e.g., event E) can cause the entry into two states 76 and 78. The left-to-right priority indicates that state 76 will be entered when the state machine resides in substates 56 and 68 upon event E. Alternatively, a subscript notation can be utilized in each of parallel states 52 and 54 to indicate the priority of parallel states 52 and 54. In another embodiment, an up and down orientation or right-to-left orientation can determine the priority between parallel states 52 and 54. More complex embodiments of statecharts can also be utilized.

When state 78 is active, either state 88 or 86 is active. When parallel states 54 52 are active, one of substate 56 or 66 and one of substate 58 or 56 is active. The graphical notation wherein superstate 51 encompasses parallel states 52 and 54 simplifies the logical demonstration of statechart 50.

Substate 56 can also include a history element 82. History element 82 is utilized to indicate that substate 56 should be entered the next time parallel state 52 is entered. For example, if state 56 was exited when the state machine entered state 76 upon event E, the next time the state machine enters parallel state 52 it enters state 56 as opposed to state 66 as symbolized by history element 82. Similarly, state 58 can be associated with a history element 84.

Figure 3:
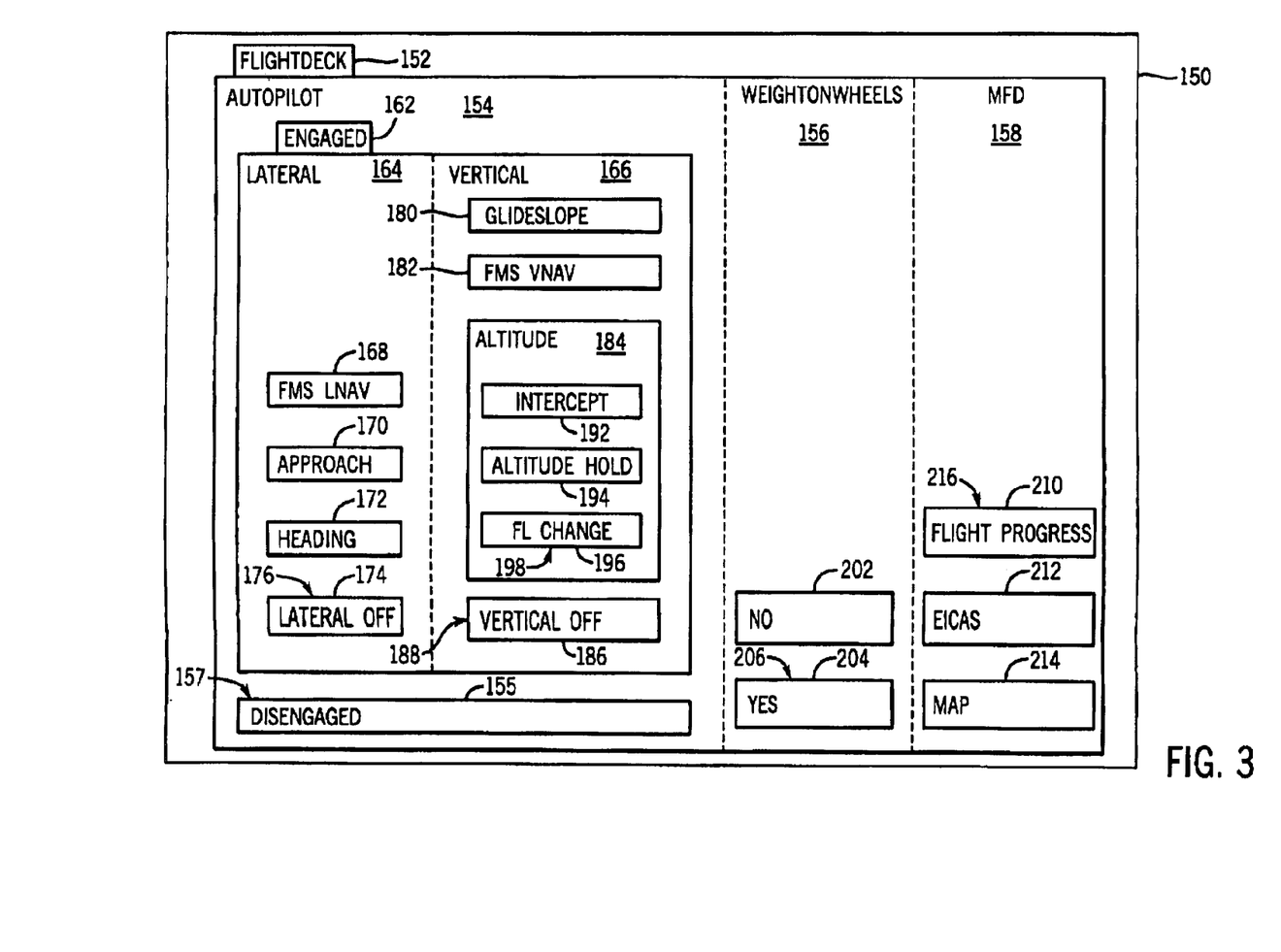
FIG. 3 is a schematic drawing of a screen utilized by the statechart editor illustrated in FIG. 1.

With reference to FIG. 3, a screen 150 for provision by statechart editor 32 (FIG. 1) is disclosed. Screen 150 includes a superstate 152 (flight deck). Superstate 152 includes a parallel state 154 (auto pilot), a parallel state 156 (weight on wheels), and a parallel state 158 (MFD). Parallel state 154 includes a substate 162 (engaged) that includes a parallel substate 164 (lateral) and a parallel substate 166 (vertical). Parallel state 154 also includes a substate 155 (disengage) that includes a history element 157. Parallel substate 164 includes a substate 168 (FMSLNAV), a substate 170 (approach), a substate 172 (heading), and a substate 174 (lateral off). Substate 174 includes a history element 176.

Parallel substate 166 includes a substate 180 (glide scope), a substate 182 (FMSVNAV), a substate 184 (altitude), and a substate 186 (vertical off). Substate 186 includes a history element 188. Substate 184 also includes a substate 192 (intercept), a substate 194 (altitude hold), and substate 196 (FL change). Substate 196 includes history element 198.

Parallel state 156 includes a substate 202 (no) and a substate 204 (yes). Substate 204 includes a history element 206. Parallel state 158 includes a substate 210 (flight progress), a substate 212 (EICAS), and substate 214 (map). Substate 210 includes a history element 216.

As can be seen on screen 150 in FIG. 3, when superstate 152 is active (state machine resides in superstate 152), one substate in each of parallel states 154, 156 and 158 is active. The particular example shown in FIG. 3, includes substate 155, substate 204 and substate 210 in an active state. For simplicity, screen 150 is not shown with events associated with the various states.

Figure 4:
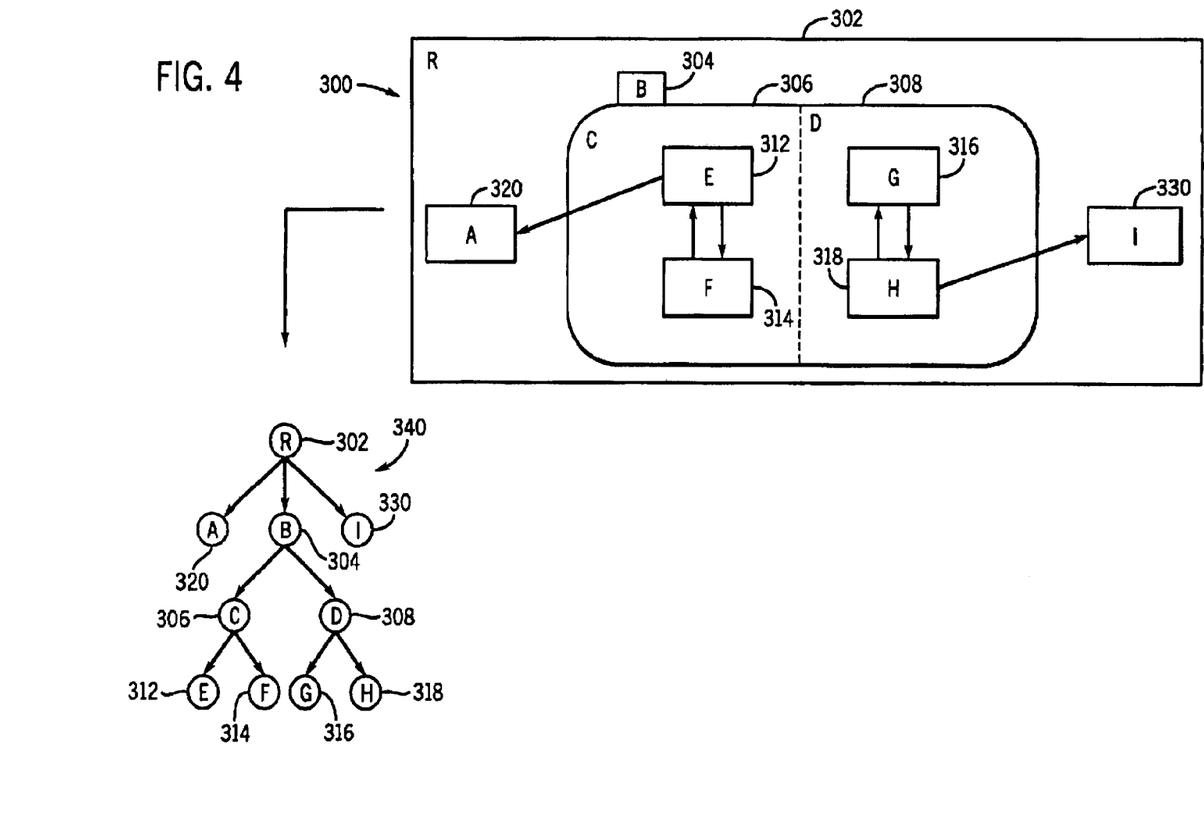
FIG. 4 is a schematic block diagram of a statechart including a tree structure in accordance with still another exemplary embodiment of the present invention.

In FIG. 4, a statechart 300 similar to statechart 50 includes superstate 302 (R). Superstate 302 includes a state 304 (B) including a parallel state 306 (C) and a parallel state 308 (D). Parallel state 306 includes a substate 312 (E) and a substate 314 (F). Parallel state 308 includes a substate 316 (G) and a substate 318 (H). State 302 also includes a state 320 (A) and a state 330 (I). The state relationship can be represented in a simplified tree structure 340 in FIG. 4 where arrows represent the relationship between states.

As shown in tree structure 340, superstate 302 includes state 304, state 320 and state 330. State 304 includes parallel states 306 and 308. Parallel state 306 includes states 312 and 314. Parallel states 308 include states 316 and 318. Events are not shown in statechart 300 for simplicity.

A mathematical discussion describes the concepts behind the advantageous statechart system discussed with reference to FIG. 2. The mathematical discussion provides notations for describing the syntax associated with statecharts. The syntax is provided as an exemplary embodiment only and is not shown to limit the scope of the claims.

Statecharts Syntax

Notation:

1. States: $S=\{s_1, \ldots, s_n\}$

2. Hierarchy: $\rho: S \rightarrow \bigcup 2^S \times \{XOR\} \times S$
$$2^S \times \{AND\} \times 2^{(S \times S)}$$
$$\bigcup \{terminal\}$$

3. Events: $E=\{e_1, \ldots, e_m\} \cup \{e_0\}$
4. Actions: $A=\{a_1, \ldots, a_q\}$
5. History States: $S_{hist} \subset S$
6. Transitions: $T \subset 2^s \times E \times 2^s \times A$ The number of states (n) is, of course, finite; therefore, we can enumerate the states (1). Each state can either be terminal (leaf), i.e. it has no substates, state 76 or it can be further divided into substates, (e.g. superstate 51, parallel states 52 and 54, and state 78) thereby defining a hierarchy. Substates can be of two types: AND and XOR decomposition. XOR decomposition defines hierarchy; whenever the parent state (e.g., state 78) is active, exactly one of its substates ok (e.g. substates 86 or 88) is active, too (thus XOR). This is used to refine a general parent state. A default state needs to be specified to determine which of the substates becomes active should the parent state be activated.

AND decomposition is used to define parallel states (e.g., parallel states 52 and 54). Whenever the parent state (e.g., superstate 51) is active, all of its substates (parallel states 52 and 54) are active, too (AND). There is no need for a default state. Instead, a total order for the substates has to be specified; this is what the relation is for ($\leq_{AND} \subset S \times S$). Notation (2) shows the hierarchy function $\rho$ that, for each state, defines it to be a terminal state or a parent state of AND or XOR substates, with a default state in the latter case.

Notations (3) and (4) enumerate the events and actions. There is no distinction between internal and external actions or events, respectively. $e_0$ is the designated empty event which indicates that none of the actual events has occurred. Notation (5) lists the history states. Notation (6) defines the transitions. Transitions consist of a source set of states that have to be active before the transition can become active, a triggering event, a target state set and a resulting action.

Definition: (Descendants)

For a set of states S, a state $s \in S$, and a hierarchy function $\rho$ as defined above, we define a descendants function $\rho': S \to 2^S$ as follows:

$$7.\ \rho'(s) := \begin{cases} sub_{and}, & \rho(s) = (sub_{and}, AND, \leq_{AND}) \\ sub_{xor}, & \rho(s) = (sub_{xor}, XOR, s_{def}) \\ \{\ \}, & else \end{cases}$$

$\rho'(s)$ denotes only the substates of s, without the additional type and default state information.

We extend the definition of $\rho'$ to handle sets of states as arguments, too. For a subset $S' \subset S$ we define:

$$8.\ \rho'(S') := \bigcup_{s \in S'} \rho'(s),$$

thus the extended function is $\rho': S \cup 2^S \to 2^S$.

Definition: (Root State)

For a set of states S and a hierarchy function $\rho$ as above, we define:

9. s is a root state: $\Leftrightarrow \forall s' \in S,\ s' \neq s: s \notin \rho'(s')$ notation: $s \in Root(S, \rho)$ Definition: (Substate Closure)

For a set of states S, a state $s \in S$, and a hierarchy function $\rho$ as defined above, we define:

10. $\rho^*(s) := \{s' \in S | \exists n \in IN: s' \in \rho'^{(n)}(s)\}$

Note: $\rho'^{(n)}(s)$ denotes applying $\rho'$ n times.

Definition: (Statechart)

For S, E, A, T, $\rho$ and $S_{hist}$ defined as above, we define:

11. $SC = (S, E, A, T, \rho, S_{hist})$ is a statechart: $\Leftrightarrow$

|Root(S, $\rho$)|=1 notation: Root(S, $\rho$)={$s_{root}$}

(unique root state)

$\forall s \in S$:

$\rho(s)$=terminal $\lor \rho(s) = (S_{sub}, AND, \leq_{AND})$, $S_{sub} \neq \{\ \}$, $(S_{sub}, \leq_{AND})$ totally ordered set $\lor \rho(s) = (S_{sub}, XOR, s_{def})$, $S_{sub} \neq \{\ \}$, $s_{def} \in S_{sub}$ (well-defined hierarchy function, default states)

$\forall s \in S, s_1, s_2 \in \rho'(s): \rho^*(s_1) \cap \rho^*(s_2) \neq \{\ \}) \Rightarrow s_1 = s_2$ $\rho'(s) = S_{sub} \Rightarrow s \notin S_{sub}$ (tree structure of states)

$S_{hist} \subset \{s \in S | \rho(S) = (S_{sub}, XOR, s_{def})\}$ for suitable $S_{sub}$, $s_{def}$ (history states)

$t = (S_{source}, e, S_{target}, a)$, $t' = (S'_{source}, e, S'_{target}, a')$, $S_{source} \subset S'_{source} \lor S'_{source} \subset S_{source} \Rightarrow t = t'$ (no two transitions shall share their event and their source states)

$t = (S_{source}, e, S_{target}, a)$, $t' = (S'_{source}, e_0, S'_{target}, a')$, $S_{source} \subset S'_{source} \lor S'_{source} \subset S_{source} \Rightarrow t = t'$ (no two transitions shall share their source states is one of them is associated with the empty event)

$t \in T, t = (S_{source}, e, S_{target}, a),\ \Rightarrow \forall s \in (S_{source} \setminus s_{root}) \cup S_{target}$:

$\exists s_{parent} \in S: \rho(s_{parent}) = (S_{sub}, XOR, S_{def}) \land s \in S_{sub}$ (source states—except root state—and target states have to be recruited from XOR children)

$t \in T, t = (S_{source}, e, S_{target}, a),\ \Rightarrow \{S^* | (S^*, hist)$ is a configuration $\land S_{target} \subset S^*\} \neq \{\ \}$ (target state set has to be consistent, i.e. there is a configuration that contains the target state set)

Thus, for (S, E, A, T, $\rho$, $S_{hist}$) to be a statechart, one (and only one) root state (named $S_{root}$) exists. The hierarchy function $\rho$ must be well-defined, default states must actually be chosen from the available sub states. Also, $\rho$ must define a tree structure. This is ensured by the requirement that the sets of substates of sibling states are pairwise disjoint. History states can be chosen only from those states for which XOR decomposition is defined. Finally, a number of requirements are specified for transitions: they must have either different source sets or different events, the target and source states must be XOR children, and no transition must specify an inconsistent target set.

Statechart Configuration:

For a statechart SC=(S, E, A, T, $\rho$, $S_{hist}$), a history function hist: $S_{hist} \to S$, hist well-defined, and a set $S_{active}$ of active states, we define:

12. $C_{SC} = (S_{active}, hist)$ is a configuration: $\Leftrightarrow$ $s_{root} \in S_{active}$ $s \in S_{active}$, $\rho(s) = (S_{sub},\ XOR,\ s_{def})$
$\Rightarrow |\{s' \in S_{sub} | s' \in S_{active}\}| = 1$ $s \in S_{active}$, $\rho(s) = (S_{sub}, AND, \leq_{AND}) \Rightarrow \forall s' \in S_{sub}: s' \in S_{active}$ $s \notin S_{active}$, $\rho'(s) = (S_{sub}) \Rightarrow S_{sub} \cap S_{active} = \{\ \}$ $hist(s) = s_h \Rightarrow \rho(s) = (S_{sub}, XOR, s_{def})$ and $s_h \in S_{sub}$ Thus, the designated root state is always active. For an active XOR parent state, one (and only one) of its substates is active, too. For an active AND parent state, all of its substates are active, too. For an inactive parent, all of its substates are inactive. The history function maps parent states to valid substates of the respective XOR decomposition.

Definition: (Start Configuration)

For a statechart SC=(S, E, A, T, $\rho$, $S_{hist}$), we define the start configuration.

13. $C_0 := (S_0, hist_0)$,

Where $S_0$ is defined by induction as follows:

$s_{root} \in S_0$ $s \in S_0$, $\rho(s) = (S_{sub}, XOR, s_{def}) \Rightarrow s_{def} \in S_0$ $s \in S_0$, $\rho(s) = (S_{sub}, AND, \leq_{AND}) \Rightarrow S_{sub} \subset S_0$ no other states are in $S_0$ The history function of the start configuration is defined by 14. $hist_0: S_{hist} \to S: s \to s_{def}$ if $\rho(s) = (S_{sub}, XOR, s_{def})$ This maps an XOR parent to its defined default state. We have to show that this initial history function is well-defined.

Lemma:

15. $\text{hist}_0: S_{hist} \to S$ is well defied.

Proof: By definition of the statechart SC, $S_{hist} \subset \{s \in S | \rho(s) = (S_{sub}, \text{XOR}, s_{def})\}$.

Thus, $\forall s \in S_{hist}: \exists s_{def} \in S, S_{sub} \subset S: \rho(s) = (S_{sub}, \text{XOR}, s_{def})$ Statecharts Semantics The above description defines a formal model for specifying statecharts 50 in the state machine configurations. The above description defines a set of actions and events and determines when possible configurations for default are star configurations. The description below provides an exemplary embodiment of a state machine executing statecharts. The state machine exists in an original configuration and an input event results in a target configuration for the state machine. The target configuration can trigger zero or more available actions. According to this embodiment, several rules are provided. First, the behavior of the state machine is predictable. For a given configuration in an input event, only one target configuration and one set of resulting actions can be valid (deterministic). Second, a list is provided for a set of actions. In this way, the order in which actions are triggered can be classified. The list, rather than a set of actions, allows the same action to be triggered by twice by one event (in parallel states of the state machine). Third, the target configuration adheres to the definition of the configuration. Generally, a function operates as follows:

16. [SC]: $(C, e) \mapsto (C', n_a, AL)$,
   with $n_a \in \text{IN}, AL: \{1 \ldots n_a \to A\}$
   where SC is the statechart.

Thus, a formal model to specify statecharts and state machine configurations is shown. In addition, a set of events and actions is defined. One of the possible configurations to be the default or start configuration is determined above.

The actual execution of the statechart is discussed below. Wherein descriptions of the machine's operations as it takes an origin configuration and an input event and results in a target configuration, thereby triggering zero or more of the available actions. The behavior of a state machine shall be predictable. For a given configuration and an input event, only one target configuration and one set of resulting actions shall be valid.

The order in which the actions are triggered may be important. Thus, rather than a set of actions, a list is appropriate. This will also allow the same action to be triggered twice by one event (in parallel states of the machine).

The target configuration must adhere to the definition of a configuration.

A function of the following type can be utilized:

16. [SC]: $(C, e) \to (C', n_a, AL)$,
   with $n_a \in \text{IN}, AL: \{1 \ldots n_a \to A\}$
   SC is, the statechart.

The semantics function (indicated by the [ ] brackets around the actual syntactical statechart definition SC) depends on the actual statechart. C is the original configuration, C' the target configuration. E is the input event being processed, possibly it is the empty event $e_o$. $n_a$ specifies the number of resulting actions, whereas AL (action list) determines the actions themselves. Thus, [SC] will define the single-step behavior for a statechart SC. Several definitions have to be prepared before the semantics function can be specified.

Definition: (Hot States)

For a Statechart $SC=(S, E, A, T, p, S_{hist})$ and a corresponding configuration $C=(S_{active}, \text{hist})$, the set of potentially hot states is defined as 17. $T_C := \{(S_{source}, e, S_{target}, a) | S_{source} \subset S_{active}\}$ $T_C$ denotes the transitions that could potentially be used when the next input event is received, i.e. the transitions whose source states are all active. Similarly, with an event $e \in E$, hot states are defined as 18. $T_{C,e} := \{(S_{source}, e', S_{target}, a) \in T_C | e' = e \lor e' = e_o\}$ $T_{C,e}$ denotes of course those elements of $T_C$ that either match the specified event or that do not require an input event. In the latter case, the transition specifies the empty event $e_o$.

The set $T_{C,e}$ determines the transitions that could be used while a new input is being processed. Problems can arise when the order in which multiple transitions in $T_{C,e}$ are processed determines the order in which their associated actions are performed. Thus, the order has influence on the semantics and needs to be deterministic.

Two transitions $t_1, t_2 \in T_{C,e}$, after $t_1$ has been processed and its target states have been activated, the source states of $t_2$ might no longer be active. That is because activation of new target states usually requires deactivation of siblings. In this case, $t_2$ cannot be processed any more. Therefore, choosing a predetermined execution order is even more important for the semantics, for not only the execution order of actions, but whether or not they are executed at all depends on it.

The intermediate goal is therefore to define an order on the transitions. The first step, however, is to specify an order on the states of the Statechart. Execution is from left to right in parallel states (AND) and from the lower to the higher levels of hierarchy (XOR, i.e. leafs first, root last). The XOR hierarchy is clearly visible by the hierarchy function p; with XOR hierarchy, only one substate can be active at any time, which of course eliminates any potential non-determinism. On the other hand, the order of parallel substates (AND) is defined by the $<_{AND}$ relation that comes with p:

Definition: (Order on States)

For a Statechart $SC=(S, E, A, T, \rho, S_{hist})$ an order on the states $\leq \subset S \times S$ is defined as follows:

$\forall s \in S: s \leq s$ (reflexive)

$\forall s \in S: \rho(s)=(S_{sub}, \text{XOR}, s_{def}) \Rightarrow s' \leq s \forall s' \in S_{sub}$ $\forall s \in S: \rho(s)=(S_{sub}, \text{AND}, \leq_{AND}) \Rightarrow \forall s_1, s_2 \in S_{sub}: s_1 \leq_{AND} s_2$
$\Rightarrow s_1 \leq s_2$ and $s' \leq s \forall s' \in S_{sub}$ $\forall (s_1, s_2) \in \leq, (s_2, s_3) \in \leq: (s_1, s_3) \in \leq$ (transitive closure)

Note that this order $\leq$ does not define a totally ordered set on the states in S. That is because siblings in XOR substates are not ordered by $\leq$. However, these siblings are only mutually exclusively active in any valid configuration. No two of these siblings (or their descendants) can be active at the same time, thus there is no need for an order that exceeds the one given above.

Lemma:

For a Statechart $SC=(S, E, A, T, \rho, S$ and an order $\leq \subset S \times S$ as defined above, for each valid configuration $C=(S_{active}, \text{hist}), (S_{active}, \leq)$ is a totally ordered set.

Proof:

A totally ordered set is reflexive, transitive, and for s, $s' \in S_{active}: s \leq s'$ or $s' \leq s$ 1. $\forall s \in S_{active}: s \leq s$ by definition of $\leq$ (reflexive)

2. $\forall q, r, s, \in S_{active}: q \leq r, r \leq s \Rightarrow q \leq s$ by definition of $\leq$ (transitive)

3. $\forall s, s' \in S_{active}$:
   a) $s \in \rho^*(s')$: s is a descendant of s', so there is $n \in \text{IN}, n>0$: $s \in \rho'^{(n)}(s')$, i.e., by applying p' n times we get down to the level of s. Therefore, there are states $s_1 \ldots s_{n-1}$ so that $s \leq s_1 \leq \ldots \leq s_{n-1} \leq s'$ by definition of $\leq$. Thus: $s \leq s'$ (due to transitive definition of $\leq$).

b) $s' \epsilon \rho^*(s)$: analogous c) else, i.e. neither s is a descendant of s' nor vice versa: s and s' have a lowest common ancestor $s_{ancestor}$ in the hierarchy tree. This ancestor state must be of AND type because only this way both s and s' can be in $s_{active}$. The order $\leq_{AND}$ of $s_{ancestor}$ defines the order of s and s'.

Thus, for any two states that can be active at the same time, there is always an order for these states. This order to defines another order, an order on sets of states:

Definition: (Order on Sets of States)

For a Statechart SC=(S, E, A, T, $\rho$, $S_{hist}$), an order $\leq \subset S \times S$ as defined above and a subset $S' \subset S$ so that $(S', \leq)$ is a totally ordered set, we define an order $\leq_{set} \subset 2^{s'} \times 2^{s'}$ on sets of states. Let X and Y denote the subsets of S' that shall be compared; $X=\{x_1, \ldots, x_n\}$ and $Y=\{y_1, \ldots, y_m\}$. Because $(S', \leq)$ is a totally ordered set, it can be assumed that $x_1 \leq \ldots \leq x_1$ and $y_1 \leq \ldots y_m$.

19. $X \leq_{set} Y$: $\Leftrightarrow \exists k \in IN$, $k>0$, $k \leq \min(n,m)$, so that $x_i=y_i \forall i=1 \ldots k-1$ and $x_{k,} \leq y_k$ and $x_k \neq y_k$ or $n \leq m$ and $x_i=y_i \forall i=1 \ldots n$ This means that the smallest k-1 elements of both A and B are identical, and the one that is immediately following determines the order of the two sets. Should all n elements of the first set be identical to the first n elements of the second set, the first set is defined to be smaller.

Definition: (Order on Transitions)

For a Statechart SC=(S, E, A, T, $\rho$, $S_{hist}$), a configuration C=($S_{active}$, hist), an event e$\in$E, hot transitions t, t'$\in T_{C.e}$, t=($S_{source}$, e, $S_{target}$, a), and t'=($S'_{source}$, e', $S'_{target}$, a'), we define the order $\leq_T \subset T_{C.e} \times T_{C.e}$ by 20. $t \leq_T t'$: $\Leftrightarrow S_{source} \leq_{set} S'_{source}$ Using the order $\leq_T$, a set of hot transitions $T_{hot}$ can be described as $T_{hot}=\{t^h_1, \ldots t^h_n\}$ where $t^h_1 \leq \ldots \leq t^h_n$. This order determines the execution order of the state machine.

Having this order defined is a difference to conventional Statechart models. Where other models support the idea that transitions and actions are processed atomically, only to find out later that the implementation of such an ideal model causes a number of issues, the model respects right from the start the fact that execution on machines is serial. Thus, the semantics are always executable and well-defined.

Activating an Inactive State

When an inactive state is activated due to a transition, the action associated with the transition is triggered after these events occur:

The new state has to become member of the active states set.

Any siblings of the new active (XOR) state (and their descendants) have to be deactivated. Note: The new state is among the target state set of a transition; therefore, we may assume that it is indeed an XOR child.

Descendants of the new active state have to be activated: for XOR states, activate the last recently active child (history function) for history states; otherwise, active the default child state. For AND states, activate all descendants.

Ancestors of the new state have be activated. Potential siblings of XOR ancestors need to be deactivated.

The history function has to be adjusted to reflect the new situation.

The function that performs these steps is called activate:

21. Activate: $2^s \times S_{target} \rightarrow 2^s$: $(S_{active}, s_{new}) \mapsto S'_{active}$
where $S_{target}=\{s \in S | \exists s_{parent} \in S: \rho(s_{parent})=(S_{sub}, XOR, S_{def}) \wedge s \in S_{sub}\}$ The activate function is only defined for states $s_{new}$ that are XOR children (only this subset qualifies for target states).

The first utility function that is computed to determine the ancestors of a state, all the way up to the root state. This function identifies states that have to be activated in the hierarchy above the transition's target state:

21. ancestors: $S \rightarrow 2^s$: $s \mapsto \{s^* \in S | s \in \rho^*(s^*)\}$ The function returns all those states whose substate closure contains s, i.e. it returns all the ancestors of s.

Next XOR Siblings of states are identified. This will be used to deactivate siblings (and their ancestors) of activated states:

23. siblings: $2^s \rightarrow 2^s$: $S_{origin} \mapsto \{s \in S | \exists s_{parent} \in S: \rho(s_{parent})=(S_{sub}, XOR, s_{def}) \wedge s \in S_{sub} \wedge S_{origin} \cap S_{sub} \neq \{ \} \wedge s \notin S_{origin}\}$ Thus, for a set of origin states the siblings function will return all those states that are siblings of at least one of the states in $s_{origin}$, excluding the trivial elements that are already contained in $s_{origin}$.

Also, the new states that get activated below the triggered state must be determined. These are history states or, in absence of a defined history value, the default substates:

24. descActivate: $S \rightarrow 2^s$:

$$s \mapsto \begin{cases} \{ \}, & \rho(s) = \text{terminal} \\ S_{sub} \cup \bigcup_{s^* \in S_{sub}} descActivate(s^*), & \rho(s) = (S_{sub}, AND, \leq_{AND}) \\ \{s_h\} \cup descActivate(s_h), & \rho(s) = (S_{sub}, XOR, s_{def}) \wedge s \in S_{hist} \wedge s_h = hist(s) \\ \{s_{def}\} \cup descActivate(s_{def}), & \rho(s) = (S_{sub}, XOR, s_{def}) \wedge s \notin S_{hist} \end{cases}$$

Thus, the recursively defined descActivate function terminates if the argument is a terminal state (leaf), or it returns the history/default substate for an XOR parent and all substates for an AND parent. Unless a terminal state has been hit, descActivate is referenced recursively to also include states on lower levels of the hierarchy.

Finally, the function definition for line 21 is delivered:

25. activate: $(S_{activate}, s_{new}) \mapsto$ $$\begin{cases} (S_{active} \cup ancestors(s_{new})) \setminus \rho*(siblings(ancestors(s_{new}))) \cup \\ descActivate(s_{new}), s_{new} \notin S_{active} \\ S_{active}, & \text{, else} \end{cases}$$

Updating the History Function

Once the set of active states has been changed, the history function as the second component of the configuration needs to be adjusted accordingly. History states are mapped to presently active substates if these exist; otherwise, the history function is defined by the formerly set value. With $S_{active}$ being the new configuration's set of active states and hist being the former history function, this works as follows:

26. $histSingleStep_{hist}(s) :=$ $$\begin{cases} s_{child}, & \rho(s) = (S_{sub}, XOR, s_{def}), s_{child} \in S_{sub}, s_{child} \in S_{active} \\ hist(s), & \text{else} \end{cases}$$

The complete new history function for the new configuration is delivered by the following function:

27. histUpdate: $(S_{hist} \rightarrow S) \rightarrow (S_{hist} \rightarrow S)$: hist $\mapsto$ histSingleStep$_{hist}$ histUpdate will be used after changing the active states to generate the new history function, making a "snapshot" of the currently active states.

Processing an Input Event

Upon reception of a new input event $e \in E$ in the configuration C, the following has to happen:

determine the hot transitions $T_{C,e}$ bring these transitions into their execution order as outlined above for each transition $t_1$:

if source states of $t_1$ active then activate target states of $t_1$ (multiple target states: in the order defined by $\leq$ set) trigger action of $t_1$     end if end for The check for activity of the source states of a transition is necessary because activating a particular state in a prior iteration of the loop may have caused originally active states to become inactive.

Definition: (Transition Semantics)

For a Statechart SC=(S, E, A, T, p, $S_{hist}$) and a transition $t=(S_{source}, e, S_{target}, a)$, where the target states can be listed as $S_{target}=\{s_1 \ldots, s_k\}$ and $s_1 \leq_T \ldots \leq_T s_k$, the semantics of the transition t is defined as follows:

28. $[t]:2^s \to 2^s \times A \cup \{noAction\}$:

$$S_{active} \to \begin{cases} (\text{activate}(\text{activate}( \ldots (\text{activate}(S_{active}, s_1, s_2), \ldots ), s_k), a), \\ S_{source} \subset S_{active} \\ (S_{active}, noAction), \text{else} \end{cases}$$

A set of active states is mapped to a resulting set of active states and to the resulting action. Should the source states no longer be active, nothing happens, i.e., the active states are returned unchanged and no action is performed.

Note: The order $\leq$ is total on the set of target states because of the way we defined the Statechart SC. Recall that a target state set has to be consistent, i.e. there has to be a valid configuration that contains the target state set. For these configurations S does indeed define a total order on the states as demonstrated above.

Finally, we can now specify the Statechart semantics. Recall that the semantics of a Statechart SC is a function [SC]: (C, e)$\to$(C', $n_2$, AL) (see formula 16).

Definition: (Statechart Semantics)

For a Statechart SC=(S, E, A, T, $\rho$, $S_{hist}$), we define the semantics function [SC] as follows:

[SC]: (($S_{active}$,hist), e)$\mapsto$(($S'_{active}$,hist'), $n_a$, AL), with $n_a \in$ IN, AL:$\{1 \ldots n_a \to A\}$ where $T_{C,e}$ denotes the hot states for a configuration C and an event e as defined in formula 18, and $T_{C,e}$ can be listed as $\{t_1 \ldots, t_k\}$ with $t_1 \leq \ldots \leq t_k$ $S'_{active}$:=proj$_1$ [$t_k$] ( $\ldots$ (proj$_1$ [$t_1$]($S_{active}$)) $\ldots$ )

proj$_i$ ($x_1 \ldots, x_i$):=$x_i$ is the projection to the $i^{th}$ element.

hist':=histUpdated (hist)

addAction: IN$\times$(IN$\to$A)$\times$A$\to$IN$\times$(IN$\to$A):

$$((n, AL), a) \mapsto \begin{cases} (n+1, AL_{[n+1/a]}), & a \neq noAction \\ (n, AL), & \text{else} \end{cases}$$

Notation:

$f_{[x/y]}$ denotes the function that returns y as f(x) and f(x*) for all $x^* \neq x$, i.e. the value for f(x) is replaced while the remaining function is not changed. addAction expands the definition of the action list AL to include a new action, which is appended to the end of the list.

action$_i$:=proj$_2$ ([$t_i$] (proj$_1$ [$t_{i-1}$]( $\ldots$ (proj$_1$ [$t_1$]($S_{active}$) $\ldots$ )))

denotes the action of the $i^{th}$ transition that is executed for an event $(n_a, AL)$:=addAction ( $\ldots$ (addAction (0, $\bot$), action$_1$) $\ldots$, action$_k$)

is the resulting action list, where $\bot$ denotes the undefined function.

It is understood that while the detailed drawings, specific examples, and particular values given provide a preferred exemplary embodiment of the present invention, the preferred exemplary embodiment is for the purpose of illustration only. The method and apparatus of the invention is not limited to the precise details and conditions disclosed. For example, although particular graphical representation are shown and described, other types can be utilized. Various changes may be made to the details disclosed without departing from the spirit of the invention which is defined by the following claims.

What is claimed is:

1. A statechart system for use in the development of avionic software, the avionic software requiring deterministic behavior, the statechart system comprising:

a statechart stored on a computer readable medium, the statechart comprising:

a first state;

a second state; and a third state, the third state including the first state and the second state, the first state being parallel to and simultaneously active with the second state when the third state is active, wherein the first state is ordered with respect to the second state, whereby the statechart does not allow parallel states to be unordered to ensure the deterministic behavior of the statechart.

2. The statechart system of claim 1 further comprising:

a fourth state in parallel and simultaneously active with the first state and the second state and included within the third state, the fourth state being ordered with respect to the first state and the second state.

3. The statechart system of claim 2 further comprising:

a fifth state in parallel and simultaneously active with the first state, the second state and the fourth state and included within the third state, the fifth state being ordered with respect to the first state and the second state and the fourth state.

4. The statechart system of claim 1 wherein the avionic software is a graphical flight planner.

5. A modified Harel statechart system formed on a computer, the modified Harel statechart system comprising:

a modified Harel statechart formed on a computer, the modified Harel statechart including a mathematical representation of a group of states, the group of states including a first state including a plurality of ordered parallel states that are simultaneously active when the first state is active, the mathematical representation ensuring deterministic operation.

6. The modified Harel statechart system of claim 5 wherein the group of states are represented mathematically.

7. A method of providing avionic software, the method comprising:

providing a graphical representation of a state including a plurality of parallel states, the parallel states being ordered with respect to each other and simultaneously active when the state is active, the parallel states being ordered so that only one of a plurality of substate states of the parallel, simultaneously active states is active in response to a particular event; and applying the mathematical representation to an execution engine to create the avionics software.

8. The method of claim 7 wherein the avionics software is fully deterministic.

* * * * *